United States Patent [19]

Betencourt

[11] Patent Number: 4,736,901

[45] Date of Patent: Apr. 12, 1988

[54] STORAGE DEVICE FOR A DRIVE BAND, PARTICULARLY OF A PASSIVE SAFETY BELT FOR A MOTOR VEHICLE

[75] Inventor: Joseph J. Betencourt, Pont de Roide, France

[73] Assignee: Aciers et Outillage Peugeot, Audincourt, France

[21] Appl. No.: 900,944

[22] Filed: Aug. 27, 1986

[30] Foreign Application Priority Data

Aug. 27, 1985 [FR] France ................. 85 12766

[51] Int. Cl.$^4$ ............................................. B60R 72/34
[52] U.S. Cl. ................................. 242/77.1; 242/55; 242/86.52; 280/804
[58] Field of Search ............... 242/55, 67, 77.1, 86.52, 242/107.4 A; 280/801, 802, 804

[56] References Cited

U.S. PATENT DOCUMENTS

| | | | |
|---|---|---|---|
| 1,947,392 | 2/1934 | Guntermann et al. | 242/54 A |
| 2,832,590 | 4/1958 | Youngberg | 49/325 |
| 4,316,619 | 2/1982 | Suzuki et al. | 280/804 |
| 4,344,252 | 8/1982 | Suzuki et al. | 49/199 |
| 4,410,202 | 10/1983 | Takada | 280/804 |
| 4,433,509 | 2/1984 | Seppala | 49/352 |
| 4,564,218 | 1/1986 | Yokote et al. | 280/804 |
| 4,615,234 | 10/1986 | Chevance et al. | 242/54 A X |
| 4,666,097 | 5/1987 | Tsuge et al. | 242/55 |

FOREIGN PATENT DOCUMENTS 0088702  9/1983  European Pat. Off. .
2087219  5/1982  United Kingdom .

*Primary Examiner*—Donald Watkins
*Attorney, Agent, or Firm*—Sughrue, Mion, Zinn, Macpeak, and Seas

[57] ABSTRACT

Storage device for a drive band, particularly of a passive safety belt for a motor vehicle, the said drive band (2) passing over a drive member (3) actuated by an electric motor (4), characterized in that it is formed by a cassette (7) containing the said drive member (3) of the band, in which cassette is provided a guide passage (13) for the band (2) rolling up on itself from the periphery of the cassette (7).

17 Claims, 1 Drawing Sheet

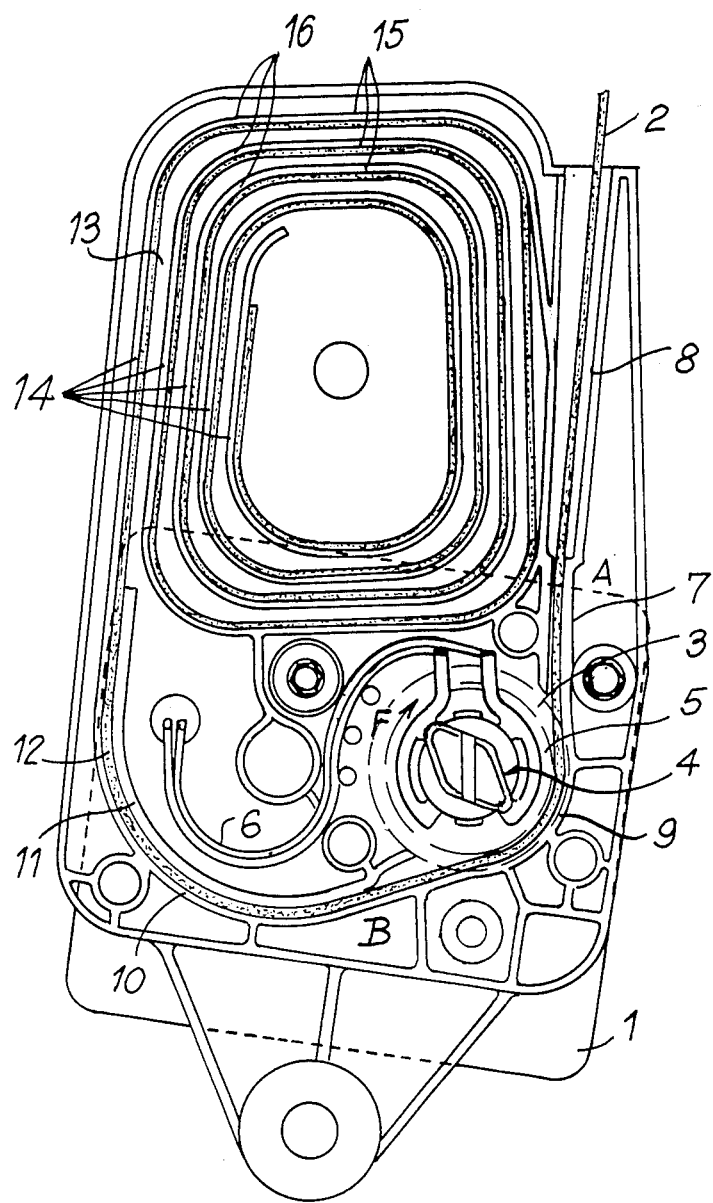

STORAGE DEVICE FOR A DRIVE BAND, PARTICULARLY OF A PASSIVE SAFETY BELT FOR A MOTOR VEHICLE

The present invention relates to passive safety belts for motor vehicles, and relates more particularly to the storage of the drive band of the movable member to which the webbing of the belt is fixed.

The movable member can generally be moved by a drive device between a standby position and a position in which the user is secured in his seat.

When the band is not continuous and the movable member is moved towards the drive device, a free end of the drive band, whose length may exceed 1 meter, must be accommodated in a housing in order to protect it.

For reasons of bulk, it is impossible to arrange for this end to be accommodated in a straight or angled tube.

The object of the invention is therefore to provide a storage device for a drive band which is of simple construction and whose bulk is reduced to the minimum.

The subject of the invention is therefore a storage device for a drive band, particularly of a passive safety belt for a motor vehicle, the said drive band passing over a drive member actuated by an electric motor, characterized in that it is formed by a cassette containing the said drive member of the band, and in which cassette is provided a guide passage for the band rolling up on itself from the periphery of the cassette.

The invention will be better understood with reference to the description which follows, given solely by way of example and with reference to the attached drawing, in which:

The single FIGURE is a front view, with the lid removed, of a drive band storage device according to the invention.

In this FIGURE there has been shown a drive device 1 for a belt 2 intended to drive a movable member (not shown) to which is coupled one end of the webbing of a passive safety belt (not shown).

The band 2 passes over a sprocket wheel 3 fixed on an electric motor 4 supplied with electric current via conductors 6.

The sprocket wheel 3 is mounted inside a cassette-type housing 7 of moulded plastic material which, in the present example, is integral with the housing of the drive device 1. The cassette 7 is of generally prismatic shape. It possesses an inlet portion 8 of slightly flared shape extended by an arched wall 9 which is concentric to the sprocket wheel 3 and delimits with the latter a passage for the band 2. The arched wall 9 is then extended by a wall 10 of relatively large radius paralleled on the inside by a wall 11 which defines with the wall 10 an access channel 12 for the band to the storage device as such.

The latter is formed by the continuation of the wall 10 which rolls up on itself from the periphery of the cassette to a central region of the latter, thus defining a guide passage 13 for the band 2. In its portion which defines the storage device, the wall 10 is formed by mutually parallel rectilinear portions 14, 15, connected by arcuate or elliptical portions 16 all of which have the same radius of curvature, whatever may be their positioning over the travel.

The curvature of the arcuate portion 16 is selected so as to permit on the one hand the band to be introduced into the storage device without permanently deforming the band and on the other hand in order that the effort required to curve the band in the elbows and the effort due to the friction against the walls of the storage device under the effect of the elastic restoration of the band should not reach a level such that the drive device 1 lacks power or that the undulations caused by buckling of the band between the walls of the storage device prevent it from advancing.

A good dimensional compromise for a band 1.6 mm thick consists in selecting a radius for the arcuate portions which is not less than 14 mm. This condition may be expressed by the equation:

$$r_{min} = e - 2,$$

r being the radius of curvature and e the thickness of the band.

The guide passage 13 defined by the rolling-up on itself of the wall 10 has a width which leaves a fairly substantial play, of the order of 0.6 to 1 mm, for the 1.6 mm-thick band.

In order to calculate this play j, the following equation may be adopted:

$$j = e/2 \pm 0.2,$$

where e is the thickness of the band, j and e being given in mm.

The fact that the cassette which constitutes the storage device is integral with the drive device permits optimum use to be made of the minimum of space available and makes it possible to dispense with the provision in the vehicle bodywork of permanent housings which would not be used when the band movement device is not required on the vehicle.

The functioning of the device which has just been described is as follows.

When the sprocket wheel 3 turns in the direction of the arrow F, the band 2 is moved from position A towards position B, entering through the form of flared inlet 8 provided between the walls 10 and 11 which are integral with the housing 7. After the channel 12, of relatively large radius, the band 2 enters the receptacle as such, formed by the rolling-up on itself of the wall 10, and bears against this wall under the effect of its own tendency to restoration.

When the sprocket wheel turns in the opposite direction to the arrow F it causes the retraction of the band out of the storage device by simple traction of the latter.

A lid (not shown) can be screwed or pushed and welded onto the housing 7 and thus protect the band 2 against any soiling or mechanical damage.

The housing 7 and its lid may advantageously be made from moulded plastic material.

In the example which has just been described, the invention is considered as being applied to a passive safety belt. It will, however, be understood that this invention is equally applicable to window cranks and to any other member for a motor vehicle in which a translatory movement is obtained by displacing a band, perforated or otherwise, of metal or plastic material, driven by a sprocket wheel or a friction device.

What I claim is:

1. A storage device for a drive band, particularly for a passive safety belt for a motor vehicle, said drive band passing over a drive member actuated by an electric motor, said storage device being formed by a cassette containing said drive member of the band, in which cassette is provided a guide passage for the band rolling up on itself from the periphery of the cassette, wherein said cassette is of generally prismatic shape and said guide passage is formed by rectilinear portions interconnected by arched portions all of which have the same radius of curvature, whatever may be their positioning over the travel of said band.

2. The storage device as claimed in claim 1, wherein the arched portions are arcuate or elliptical portions.

3. The storage device as claimed in claim 1, said drive member of which is a part of a drive device including said electric motor and mounted within a housing, and wherein the cassette is made in one piece with said housing of said drive device.

4. The storage device as claimed in claim 1, wherein the cassette is made in one piece with a housing of the drive device.

5. The storage device as claimed in claim 2, wherein the cassette is made in one piece with a housing of the drive device.

6. The storage device as claimed in claim 1, wherein said cassette additionally possesses an intake portion of generally widened shape extended by an arched wall which is concentric to the drive member and which delimits with the latter a passage for the band, said arched wall then being extended by a wall of relatively large radius paralleled on the inside by a wall which defines with the wall an access channel for the band to the storage device as such.

7. The storage device as claimed in claim 2, wherein said cassette additionally possesses an intake portion of generally widened shape extended by an arched wall which is concentric to the drive member and which delimits with the latter a passage for the band, said arched wall then being extended by a wall of relatively large radius paralleled on the inside by a wall which defines with the wall an access channel for the band to the storage device as such.

8. The storage device as claimed in claim 3, wherein said cassette additionally possesses an intake portion of generally widened shape extended by an arched wall which is concentric to the drive member and which delimits with the latter a passage for the band, said arched wall then being extended by a wall of relatively large radius paralleled on the inside by a wall which defines with the wall an access channel for the band to the storage device as such.

9. The device as claimed in claim 6, wherein said guide passage for the band is formed by the continuation of the wall made in one piece with the cassette and rolling up on itself from the periphery of the cassette to a central region of the latter.

10. The device as claimed in claim 7, wherein said guide passage for the band is formed by the continuation of the wall made in one piece with the cassette and rolling up on itself from the periphery of the cassette to a central region of the latter.

11. The device as claimed in claim 8, wherein said guide passage for the band is formed by the continuation of the wall made in one piece with the cassette and rolling up on itself from the periphery of the cassette to a central region of the latter.

12. The storage device as claimed in claim 1, 2, 3, 4 or 5, wherein the arched portions of the wall of the guide passage have a radius r related to the thickness e of the drive band in the relationship:

$$r\ min = e - 2.$$

13. The storage device as claimed in claim 6, wherein the arched portions of the wall of the guide passage have a radius r related to the thickness e of the drive band in the relationship:

$$r\ min = e - 2.$$

14. The storage device as claimed in claim 9, wherein the arched portions of the wall of the guide passage have a radius r related to the thickness e of the drive band in the relationship:

$$r\ min = e - 2.$$

15. The storage device as claimed in claim 1, wherein the guide passage for the drive band has a width which allows for the band a play j related to the thickness e of the band by the relationship:

$$j = e/2 \pm 0.2.$$

16. The storage device as claimed in claim 6, wherein the guide passage for the drive band has a width which allows for the band a play j related to the thickness e of the band by the relationship:

$$j = e/2 \pm 0.2.$$

17. The storage device as claimed in claim 12, wherein the guide passage for the drive band has a width which allows for the band a play j related to the thickness e of the band by the relationship:

$$j = e/2 \pm 0.2.$$

* * * * *